(No Model.) 5 Sheets—Sheet 2.
W. C. EDGE.
Machine for Making Wire Tubes.
No. 242,616. Patented June 7, 1881.
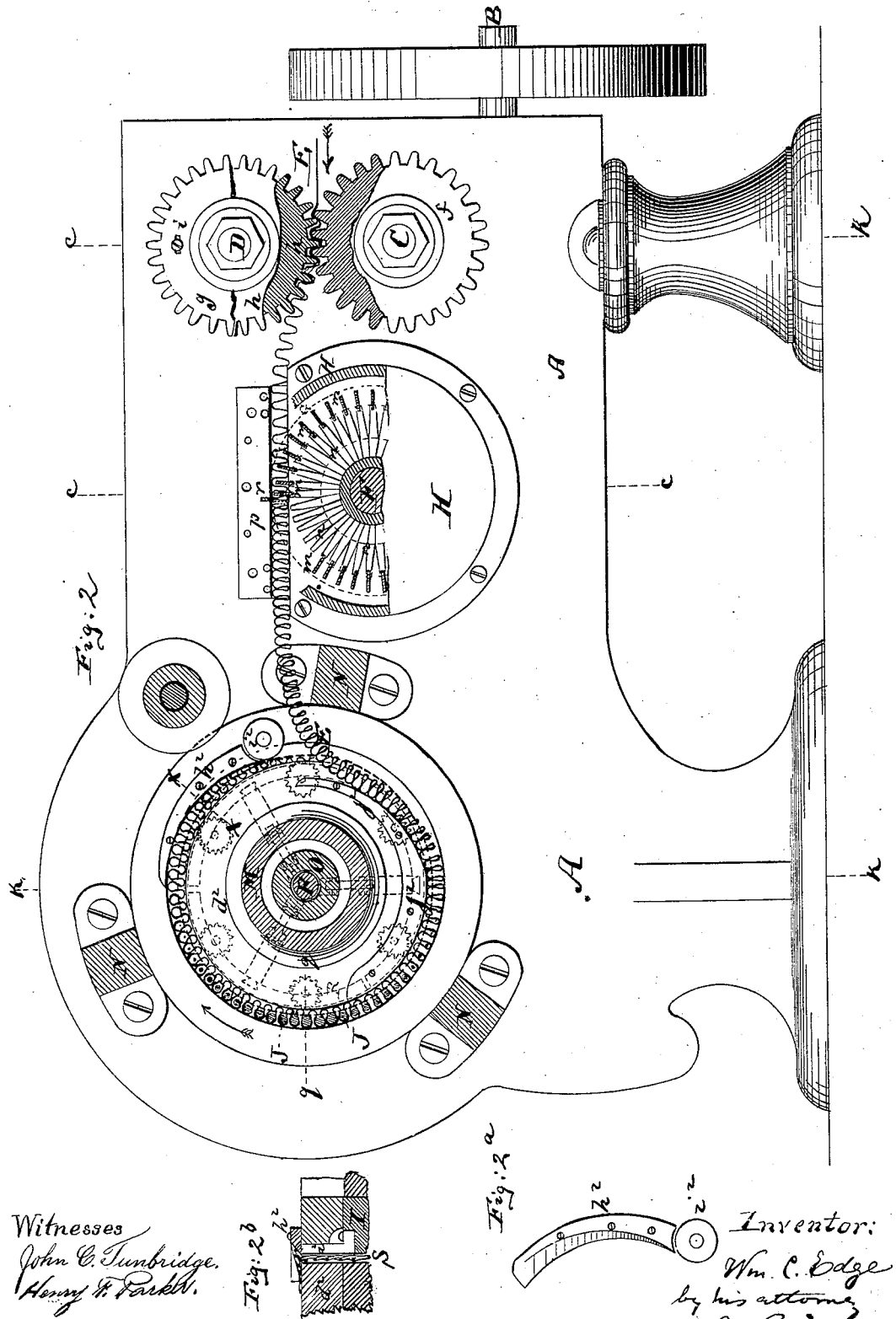
Witnesses
John C. Tunbridge.
Henry H. Parker.
Inventor:
Wm. C. Edge
by his attorney
A. v. Briesen (No Model.) 5 Sheets—Sheet 3.
W. C. EDGE.
Machine for Making Wire Tubes.
No. 242,616. Patented June 7, 1881.
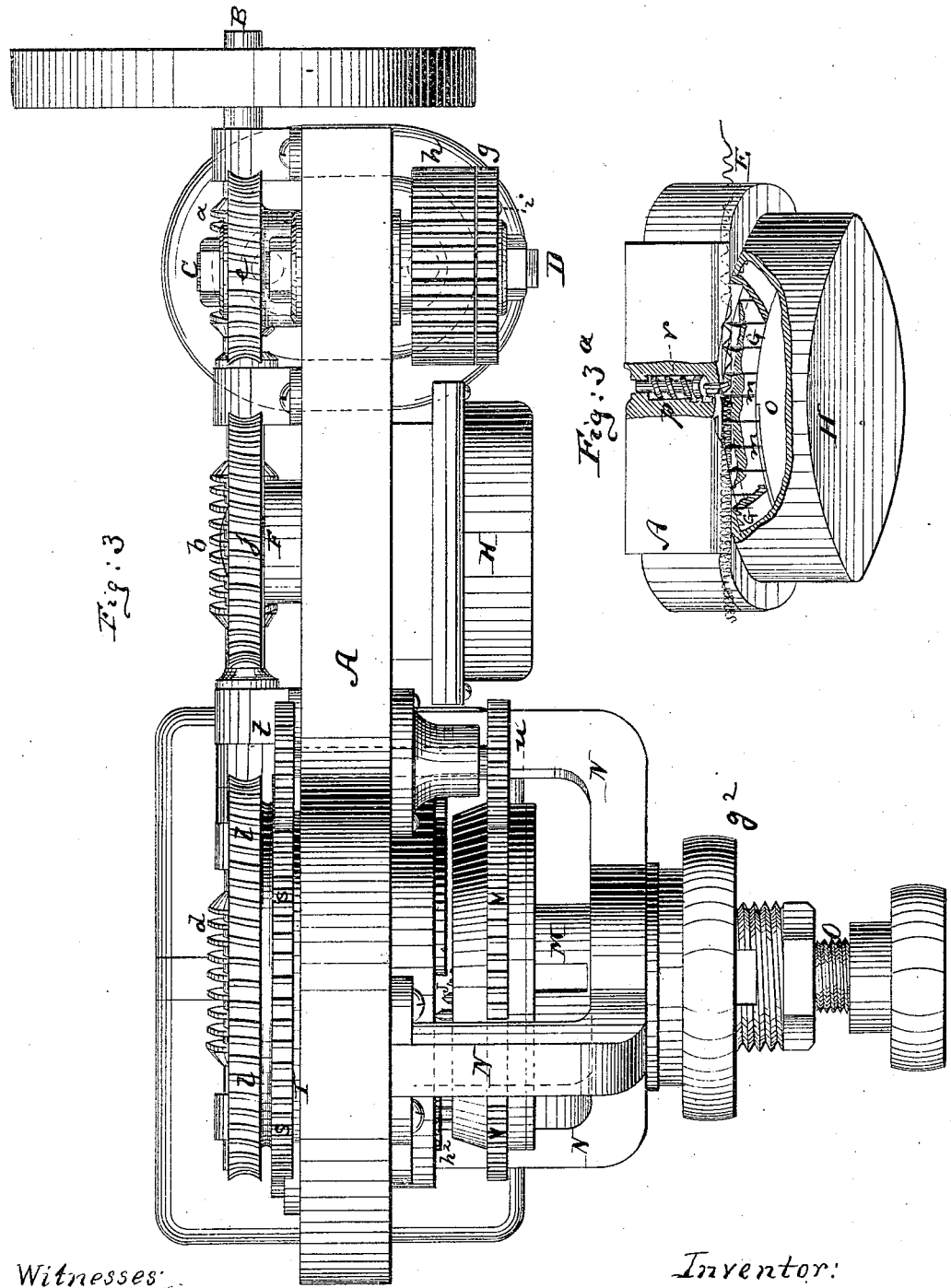
Witnesses:
John C. Tunbridge
Henry F. Parker
Inventor:
Wm. C. Edge
by his attorney
A. v. Briesen (No Model.) 5 Sheets—Sheet 4.
W. C. EDGE.
Machine for Making Wire Tubes.
No. 242,616. Patented June 7, 1881.
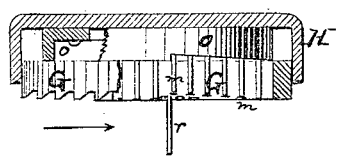
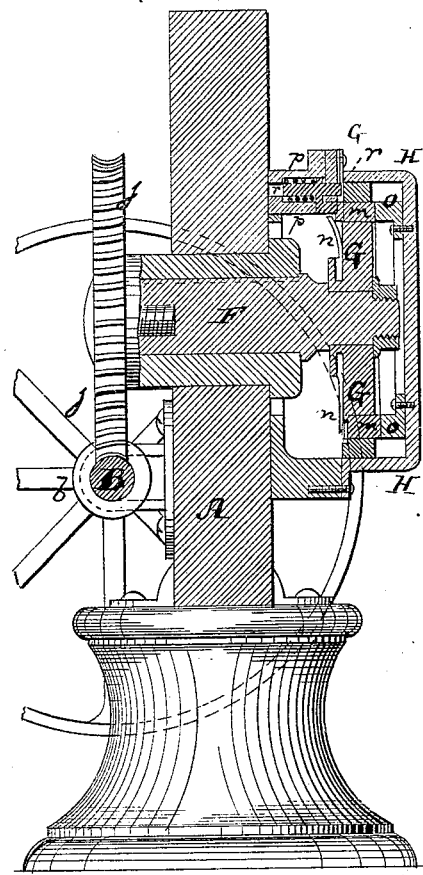
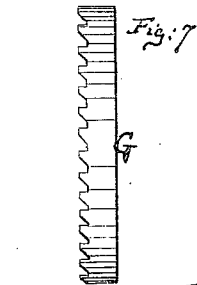
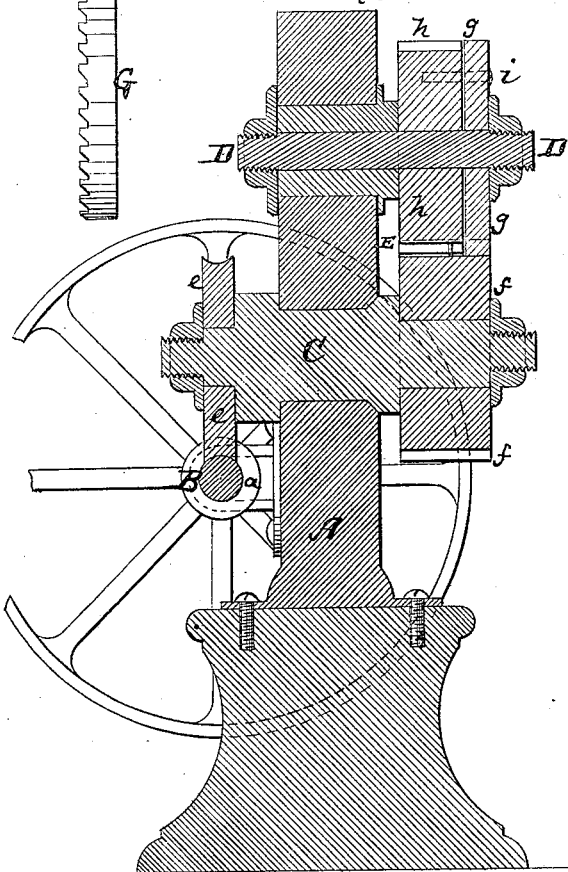
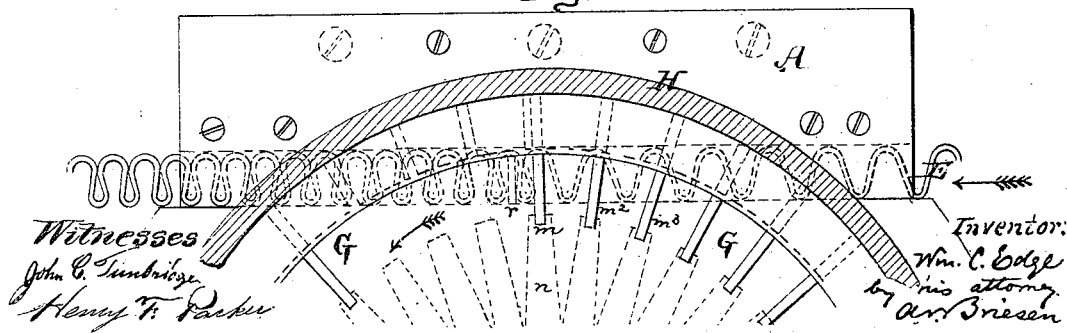
Witnesses
John C. Tunbridge
Henry T. Packer
Inventor:
Wm. C. Edge
by his attorney
A. v. Briesen (No Model.) 5 Sheets—Sheet 5.
W. C. EDGE.
Machine for Making Wire Tubes.
No. 242,616. Patented June 7, 1881.
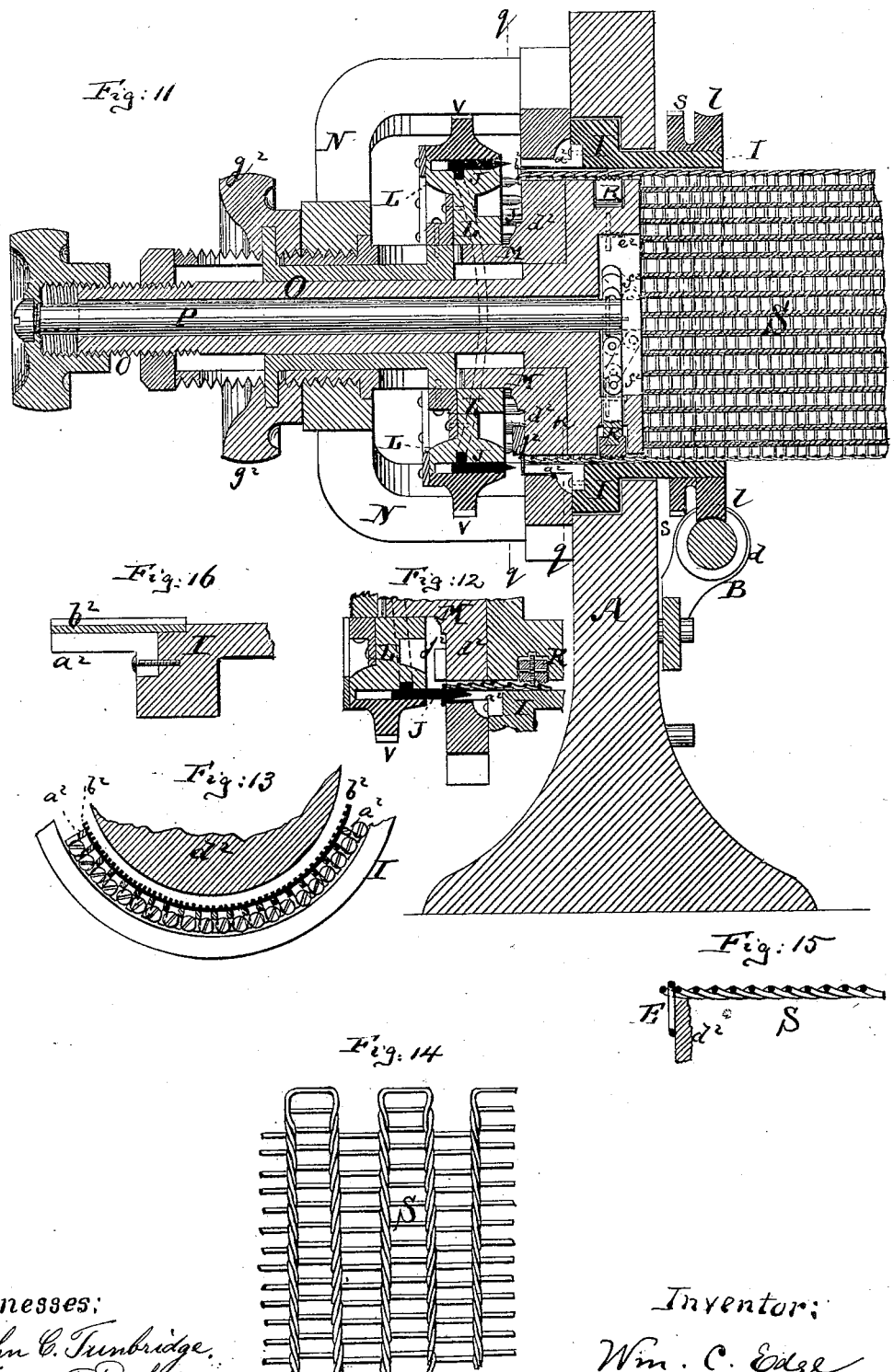
Witnesses:
John C. Tunbridge.
Henry F. Parker.
Inventor:
Wm. C. Edge
by his attorney
A. v. Briesen

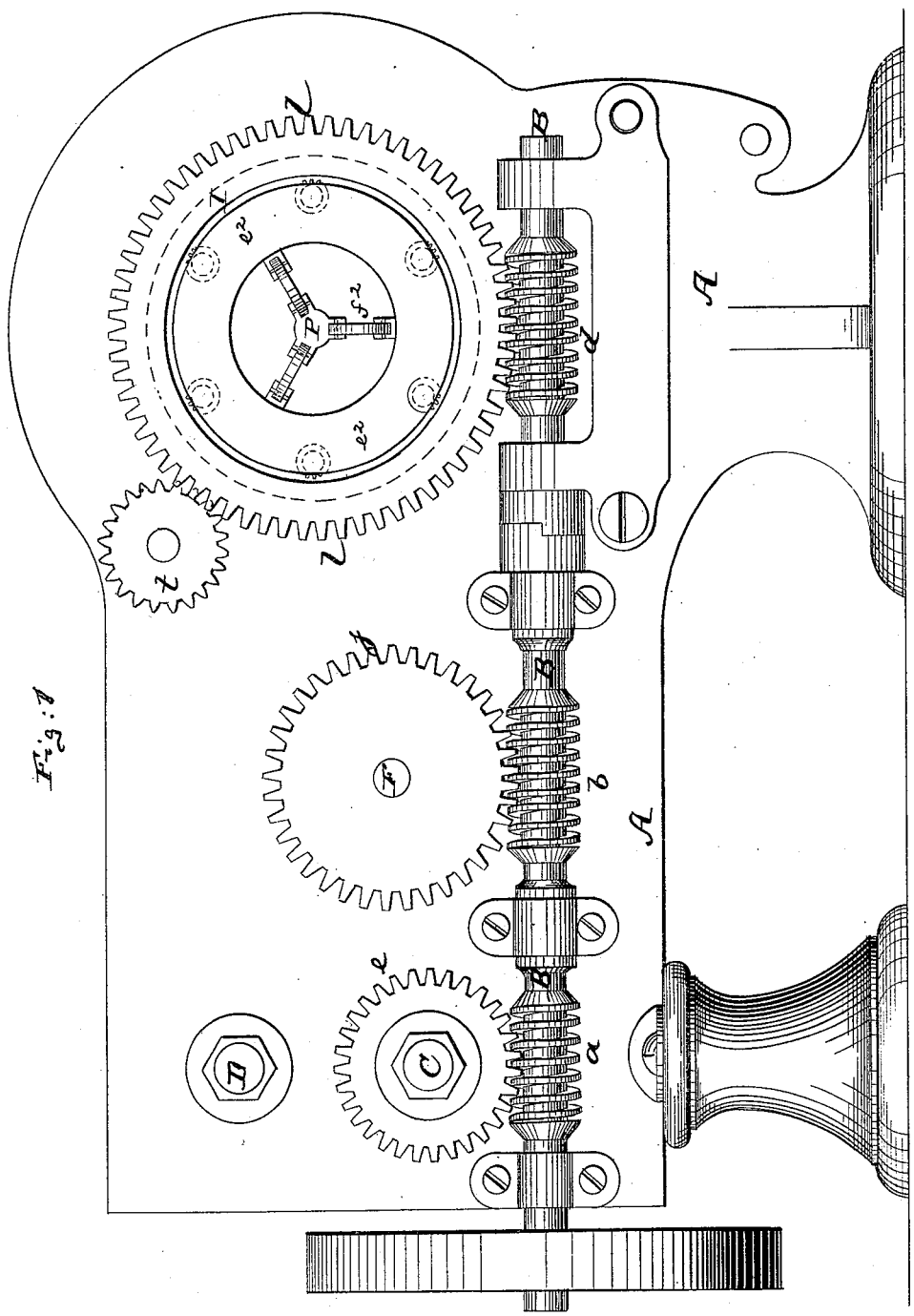

UNITED STATES PATENT OFFICE.

WILLIAM C. EDGE, OF NEWARK, NEW JERSEY.

MACHINE FOR MAKING WIRE TUBES.

SPECIFICATION forming part of Letters Patent No. 242,616, dated June 7, 1881.

Application filed November 29, 1880. (No model.)

*To all whom it may concern:*

Be it known that I, WILLIAM C. EDGE, of Newark, in the county of Essex and State of New Jersey, have invented a new and Improved Machine for Making Wire Tubes, of which the following is a specification.

This invention relates to certain improvements on the machine which is described in Letters Patent No. 127,227, dated May 28, 1872, and has reference to the making of wire tubes either for jewelers' or other purposes. The principal object of the present machine is to permit of continuous operation of one machine.

The machine described in the aforementioned Letters Patent makes the tube in a vertical position and around a guide-rod, and when the end of the guide-rod is reached the machine has to be stopped and the finished tube taken off and the new tube started.

My present invention enables me to operate the machine continuously when once started. It need never be stopped, as no dependence is placed upon any guide-rod around which the finished tube is held.

The present invention consists of various details of improvement, such as a new crimping device, a new device for contracting the crimps that are first formed by toothed wheels, a new loop-expander for enlarging the loops that have been put through finished meshes of the wire fabric, new mechanism for feeding the finished fabric continuously, and thereby presenting the meshes already formed to the loops of the crimped wire for connection therewith, all as hereinafter more fully described.

Other details of improvement will also be hereinafter referred to.

In the accompanying drawings, Figure 1 represents a rear elevation of my improved machine. Fig. 2 is a front elevation, partly in section, of the same. Fig. 2ª is a detail face view of the loop-bending cam; and Fig. 2ᵇ, a sectional view of same on line *x x*, Fig. 2. Fig. 3 is a plan or top view of the machine; Fig. 3ª, a sectional perspective view of the crimp-compressing mechanism. Fig. 4 is a vertical cross-section on the line *c c*, Fig. 2. Fig. 5 is a vertical cross-section on the line *e k*, Fig. 2. Fig. 6 is a detail edge view, partly in section, of the crimp-contracting mechanism; Fig. 7, a detail edge view of the toothed wheel carrying part of the crimp-contracting mechanism. Fig. 8 is a diagram showing the wire after it has been crimped and before the crimps have been contracted. Fig. 9 is a diagram showing some of the crimps already contracted. Fig. 10 is an enlarged face view, partly in section, of the crimp-contracting mechanism, showing some of the crimps contracted and some not. Fig. 11 is a vertical cross-section of the machine on the line *k k*, Fig. 2. Fig. 12 is a horizontal section on the line *q q*, Fig. 11. Fig. 13 is a detail vertical section on the line *k q*, Fig. 11. Fig. 14 is a diagram of the finished wire fabric made flat, and Fig. 15 is a detail sectional view through one end of the wire fabric, showing it supplied with a new loop. Fig. 16 is an enlarged section through the front end of the cylinder I.

In the accompanying drawings, the letter A represents the frame of the machine, and B is the main shaft, to which continuous rotary motion is imparted by suitable means. This main shaft, which is plainly shown in Fig. 1, is provided with three worms, *a b d*, which serve to slowly turn three gear-wheels, *e j l*, respectively. The wheel *e* is mounted upon a shaft, C, (shown in Fig. 5,) which shaft carries a broad ribbed or toothed wheel, *f*, into which gears a toothed wheel, *g*, and a ribbed wheel, *h*, both of which are carried by a shaft, D. The teeth of the wheels *g* and *h* are cut alike, or nearly so, and these two wheels are placed face to face, as shown in Fig. 5 and as indicated in Fig. 2; but they are set with reference to each other so that their teeth will not coincide, but will be somewhat out of line, so that one of the wheels—in this example the wheel *g*—will be the driving-wheel for the shaft D, and the other wheel, *h*, the crimping-wheel. The wire E, which is to be worked into the fabric, is passed, in the direction of the arrow shown in Fig. 2, between the wheels *f* and *h*, and is crimped between these wheels by means of their teeth. Now, if the wheel *h* would also be directly turned by positive contact with the teeth of the wheel *f*, there would be danger of crushing or cutting the wire E between these two wheels, and in order to avoid this I have placed the wheel *g* with its teeth somewhat out of line against the face of the wheel *h*. The driving-wheel *f* imparts motion to the crimping-wheel h by means of the wheel g, and not by means of direct contact with the teeth of the wheel h, so that the crimping-wheel h itself will have no other office to perform than to give shape to the wire. The extent of adjustment of the teeth of the wheels g and h to each other can be regulated by means of a screw or screws, i, that unite with the two wheels and pass through slots in one of the wheels, so that for the different forms of crimps the teeth may be set more or less out of line. The wheel j, which is turned by the worm b, is mounted upon a shaft, F, and serves to revolve the same slowly. This shaft F carries a wheel, G. (See Figs. 4, 6, and 7.)

Through the wheel G, near the outer circumference thereof, are fitted a series of sliding blocks, m, which are by springs n pressed against a stationary cam edge, o. These springs n are attached to and carried around by the wheel G, and press against the inner ends of the sliding blocks m. The outer ends of these sliding blocks m are in contact with the cam-surface o, which is formed on an annular plate that is firmly secured in the shell H, that embraces and in part conceals the wheel G and all its appurtenances.

Near to the inner face of the wheel G is placed, into a suitable socket, p, a spring-bolt, r, which has a forked end, as shown in Fig. 4. The upper prong of this fork, which is the farthest distant from the axis of the shaft F, is by the spring of the bolt r held in contact with the toothed or undulating face of the wheel G. This toothed or undulating face is clearly shown in Fig. 7 and indicated in Fig. 3ª, and as the wheel G revolves this toothed face, bearing against one prong of the spring-bolt, causes, in connection with the spring of the bolt, the said bolt to reciprocate in its socket or to fly in and out, and thereby to bring its lower prong alternately in line with, and out of line of, the sliding blocks m. To this end the lower prong of the spring-bolt r is ranged in the same circular line or path in which these sliding blocks m are carried by the wheel G. (See Fig. 2.)

By reference to Fig. 10, which is an enlarged diagram of this crimp-contracting mechanism, showing an outer face view of the wheel G, it will be seen that the crimped wire E, entering the shell H in the direction of the arrow shown in Fig. 10 and along the inner face of the wheel G, has its crimps, as they are made by the wheels f h, so spaced that they will be taken up successively by the inwardly-projecting blocks m of the wheel G and carried along by said wheel during the rotation of the same. Whenever an uncontracted crimp approaches the bolt r, of which the lower prong is shown by dotted lines in Fig. 10, this bolt is shot out into the way of such loop or crimp of the wire E and prevents for the time being the further advance of said crimp, and as the wheel G continues to turn, that one of the inwardly-projecting blocks m which is nearest to the bolt r and approaching the same necessarily contracts such crimp or compresses it between itself and the bolt. This is clearly shown in Fig. 10, where the bolt r is shown by dotted lines. As soon as the actuating-block m has approached the outwardly-projecting bolt r near enough to insure the requisite degree of compression of the crimp, the bolt is pushed into its socket by one of the teeth on the face of the wheel G, and at the same time the actuating-block m, which assisted in the compression just described, arrives opposite a recess in the cam-plate o, and is pressed outward by its spring n, so as to be entirely out of the way of the wire E. The wheel G continues to turn slowly, and the next succeeding block m, by so doing, feeds the wire along until the next crimp of the wire arrives opposite the lower prong of the bolt r, at which time the bolt is suddenly shot forward into such crimp, taking the place which was formerly occupied by the last preceding actuating-block m, and the operation is then continued as before.

In order to make this part of my description somewhat clearer, and pointing once more to Fig. 10 of the drawings, I will, for the sake of exactness, mark one of the sliding blocks m, the next one m², the next one m³. The wheel G turns in the direction indicated—that is to say, so that m² follows m.

The figure shows a compressed crimp between the bolt r and the block m, and I wish it to be understood that at this time the bolt r will be drawn out of the way of the wire in one direction, and the block m also drawn out of the way of the wire in the other direction. Thereupon, the wheel continuing to turn, the next block, m², travels along until the crimp within which the block m was formerly contained arrives in line with the bolt r, whereupon the bolt r is shot into said crimp, forming a stationary abutment, against which the advancing block m² will compress the crimp in the same manner in which it appears in the drawing that the block m has compressed the previous crimp between itself and the bolt.

The toothed wheel l, which is revolved by the worm d of the shaft B, is an annular wheel, as indicated in Fig. 1, and is mounted upon a cylinder, I, which is hung in the frame A, as shown in Fig. 11. The toothed wheel l carries another toothed wheel, s, which, as shown in Fig. 3, meshes into a pinion, t, whose arbor is hung in the frame. The arbor of the wheel t carries at the opposite side, which I will call the "front of the machine," (the shaft B being at the back,) another pinion, u, which gears into a toothed wheel, v, that is as large as and exactly in line with the toothed wheel l. The wheel v is also annular, but has a notched inner edge, so that in each of its notches it receives one of the expanding-pins J, (see Fig. 11,) and so that as the wheel v is revolved it will carry these expanding-pins around and cause them to move along the outer circumference of a stationary disk, L. This disk L has a cam-groove, which is inclined, as indicated in Fig. 11, and which receives inwardly-projecting lugs or noses from the expanding-pins J. Thus, as the wheel $v$ revolves around the disk L and carries the expanders J around with it, these expanders are pushed toward and drawn away from the cylinder I, and in this respect the machine is so arranged that the expander which is directly to the left of the axis of the disk L (see Fig. 2) is pushed most outward, and that one which is to the right of the axis of the disk L is drawn farthest away from the cylinder I.

To the face or front edge of the rotating cylinder I are bolted or otherwise fastened a series of projecting rods, $a^2$, between which are formed spaces, as clearly indicated in Fig. 13. The cylinder I revolves together with these projecting rods $a^2$ at precisely the same ratio as the wheel $v$ revolves, together with the expanders J, and there is an expander, J, opposite each space between two rods, $a^2$, so that whenever an expander is pushed outward it will enter into the space between the two rods $a^2$ which is in its front.

Within the circle which is formed by the rods $a^2$ is also attached to the cylinder I, as is more clearly shown in the detail view Fig. 16, a ring, $b^2$, of metal, which ring has a roughened inner circumference, as is likewise shown in Fig. 13. This ring $b^2$ surrounds a collar, $d^2$, that projects from a stationary tubing, M, that has its supports in suitable brackets, N, which are rigidly secured to the frame A. Through the tube M is put another tube, O, which carries within the cylinder I a collar, $e^2$. Through the tube O is put a rod, P, which carries at its inner end, and within the collar $e^2$, a suitable expanding device, $f^2$, made on the principle of a chuck, said expanding device affecting a split ring, R, which can, by means of said expanding device, be forced farther out or drawn more together, to lessen or increase the space between itself and the inner circumference of the cylinder I. The outer edge of this split ring has spiral grooves, screw-like, turned around it, and may also carry frictional wheels with roughened edges, as indicated by dotted lines in Fig. 1. The rod P can be turned by means of a handle at the outer end to suitably affect the expanding device. By means of a suitable other screw, $g^2$, the disk L can be moved farther or less far away from the cylinder I, so that thus access to the face of the cylinder I is easily had, and also the distance to which the expanders are inserted into said cylinder regulated.

In final explanation of the machine, I have to state that opposite to the inner end of the cylinder I is attached to a stationary part of the machine the cam-plate $h^2$, which terminates in the roller $i^2$, as indicated in Figs. 1, 2, and $2^a$.

Before operations are commenced, a cylindrical piece, S, of wire-netting, of the diameter which will enable it to be inserted between the ring $d^2$ and the cylinder I, is put into said space, and the expander $f^2$ is then set so as to gripe said netting and insure proper frictional contact upon said netting of the roughened ring $b^2$. This ring $b^2$, being turned, turns the netting, and as this netting is being revolved around the spirally-curved edges of the split ring R the netting receives a slow screw motion in a backward direction—that is to say, away from the disk L. When first inserted this ring of wire-netting is so placed that its front meshes project a short distance beyond the face of the collar $d^2$. In this position the crimped wire E, which I have described as having been shaped by the toothed wheels $f$ and $h$ and by the apparatus G and $r$, reaches contact with the inner circumference of the projecting portion of such finished wire cylinder, as indicated in Fig. 2.

It will be seen that the wire E follows the cam-edge $j^2$ of the collar $d^2$, and that it is thus gradually pushed outward until its compressed loops or crimps are passed through the projecting meshes of the finished wire cylinder which is in the machine, and when these loops have been pushed through the expanders move through them and enlarge them, so that the loops cannot again be withdrawn from the meshes of the wire cylinder, as indicated in Fig. 12. Those loops of the wire E which are to the left of the axis of the rod P receive the fullest thrust of the expander, and as in rotating the cylinder I and by the other parts of the machinery the finished wire cylinder is made to carry the wire E along with it in the direction of the arrow, the expanders are gradually withdrawn from the expanded loops and these expanded loops are then brought in contact with the cam $h^2$, and finally with the roller $i^2$, by contact with which they are gradually flattened down, as in Fig. $2^b$, and then as the screw-motion of the finished wire cylinder draws them inward they become part and parcel of the finished wire fabric.

In making this machine it is not at all essential whether the loops of the wire E are put through one mesh only of the finished wire fabric, as shown in Fig. 15, or whether they are put through two meshes of wire such as described in Patent No. 142,450, of September 2, 1873. After the machine has been started in manner described, it can be continuously operated for an indefinite length of time. The wire E after it has been locked to the finished cylinder becomes part thereof, and increases the length of wire fabric, and adapts it to receive new portions of the crimped wire E as long as may be desired.

The invention is, of course, applicable to all sorts of wire-work, whether the same be used for jewelers' purposes, for making window-screens, or the like, and I do not limit the use of the invention to any particular purpose.

I claim—

1. In a machine for crimping wire, the combination of the toothed crimping-wheel $f$ with the toothed transmitting-wheel $g$ and other crimping-wheel $h$, the wheels $g$ and $h$ being placed face to face, but with their teeth somewhat out of line, substantially as described.

2. The combination of the crimping-wheel $f$ with the toothed wheel $g$ and crimping-wheel $h$, and with the adjusting screw or screws $i$, substantially as specified.

3. The combination of the wheel G, sliding blocks $m$, springs $n$, and cam-edge $o$ with the spring-bolt $r$, the wheel G having a ribbed or toothed face for actuating said bolt, substantially as described.

4. In a machine for making wire fabrics, the combination of a reciprocating bolt, $r$, with rotating and reciprocating blocks $m$, for compressing the crimps of the wire in a continuous operation, substantially as specified.

5. The combination of the rotating cylinder I, carrying projecting rods $a^2$, and the roughened cylinder $b^2$, with the expansion-ring R, and with the loop-expanders J and their carrying-cam L, and ring V, as described.

6. The combination of the stationary collar $d^2$, loop-inserting cam $j^2$, and loop-bending cam $h^2$ with the rotating cylinder I, and with a series of rotating and reciprocating expanding-tools J, ranged in a circle, and with mechanism for moving said tools J back and forth in rotation, for operation substantially as specified.

7. In a machine for making wire fabrics, the rotating and reciprocating expanding-tools J, combined with the cylinder I, which receives the finished wire fabric, and with mechanism for gradually screwing the said fabric outward, substantially as described.

8. In a machine for making wire cylinders, the combination of apparatus for crimping the wire and for compressing the crimps with apparatus for inserting the crimps into meshes of finished wire fabric, and for gradually feeding the finished wire fabric by screw motion, all in one continuous operation, substantially as described.

WILLIAM C. EDGE.

Witnesses:
JOHN C. TUNBRIDGE,
WILLY G. E. SCHULTZ.